United States Patent

Bauer et al.

[11] Patent Number: 6,053,289
[45] Date of Patent: Apr. 25, 2000

[54] DISC BRAKE WITH AUTOMATIC ADJUSTING DEVICE

[75] Inventors: Jürgen Bauer, Weisbaden; Andreas Döll, Frankfurt am Main; Hans-Georg Keferstein, Darmstadt; Rudolf Thiel, Frankfurt am Main, all of Germany

[73] Assignee: ITT Manufacturing Enterprises Inc., Wilmington, Del.

[21] Appl. No.: 08/981,166

[22] PCT Filed: May 6, 1996

[86] PCT No.: PCT/EP96/02446

§ 371 Date: Feb. 23, 1998

§ 102(e) Date: Feb. 23, 1998

[87] PCT Pub. No.: WO97/00387

PCT Pub. Date: Jan. 3, 1997

[51] Int. Cl.[7] .................................................. F16D 55/02
[52] U.S. Cl. ................. 188/71.9; 188/196 C; 188/196 D
[58] Field of Search .................................. 188/71.8, 71.9, 188/196 C, 196 D

[56] References Cited

U.S. PATENT DOCUMENTS

| 3,920,103 | 11/1975 | Haraikawa | 188/71.9 |
|---|---|---|---|
| 4,637,498 | 1/1987 | Thompson et al. | 188/71.9 |
| 4,819,768 | 4/1989 | Czich et al. | 188/196 D |
| 5,086,884 | 2/1992 | Gordon et al. | 188/71.9 |
| 5,219,047 | 6/1993 | Fouilleux et al. | 188/71.9 |
| 5,607,033 | 3/1997 | Naedler et al. | 188/71.8 |

FOREIGN PATENT DOCUMENTS

| 0249522A1 | 5/1987 | European Pat. Off. |
| 0154398 | 4/1989 | European Pat. Off. |
| 2638214 | 10/1989 | France . |
| 3631035A1 | 9/1986 | Germany . |
| 3136958C2 | 6/1989 | Germany . |
| 2063398 | 6/1981 | United Kingdom . |

*Primary Examiner*—Paul N. Dickson
*Assistant Examiner*—Robert A. Siconolfi
*Attorney, Agent, or Firm*—Rader, Fishman & Grauer PLLC

[57] ABSTRACT

In a disc brake with automatic adjusting device, a nut (12) is screwed to an axially slidable, unrotatable spindle (11). Nut (12) is connected to a coupling element (13). An auxiliary piston (32) is slidably mounted in a bore (31) of the brake piston (4) and is connected to the nut (12) by an axially lockable snap-in connection (35, 37, 38).

21 Claims, 2 Drawing Sheets

1

DISC BRAKE WITH AUTOMATIC ADJUSTING DEVICE

BACKGROUND OF THE INVENTION

The present invention relates to a disc brake with automatic adjusting device.

European patent No. 0 403 635 discloses an adjusting device of this type. In the prior art device, a nut screwed to a spindle is integrally formed as a combination unit along with a coupling element having a conical friction surface and an auxiliary piston, slidable in a bore of the brake piston. A device of this type necessitates exact coaxial positioning of the spindle, the combination unit and the bore of the brake piston. This, in turn, entails most accurate manufacturing tolerances and increased manufacturing costs. In addition, it is absolutely necessary that the portion of the combination unit used as the auxiliary piston can be rotated together with the nut. On the other hand, hydraulic sealing of the auxiliary piston is necessary which must be easily rotatable in the known device. This provision is also disadvantageous with respect to manufacturing costs.

An object of the present invention is to improve a prior art disc brake with automatic adjusting device so that greater manufacturing tolerances are allowed and manufacturing costs are reduced.

SUMMARY OF THE INVENTION

This object is achieved by providing the auxiliary piston and the coupling element on two component parts being separately manufactured, and by connecting the component parts. In the coupling zone, a compensation of coaxialities is possible by means of a play which is to be predetermined between the two component parts. A snap-in connection, as claimed in claim 2, permits a sealing arrangement of the auxiliary piston which need not be easily rotatable because the nut may be arranged on the snap-in connection so as to be rotatable relative to the auxiliary piston. When required, different materials for the nut and the auxiliary piston may even be used.

In a preferred aspect of the present invention, the coupling element is integrally designed with the nut. This ensures a simple manufacture of the thread of the nut and the conical friction surface of the coupling element. The auxiliary piston may have a particularly simple shape in this case.

In a first advantageous embodiment of the snap-in connection, the auxiliary piston is accommodated in a bore of the nut and has on its outside a circumferential annular groove which is in alignment with an internal circumferential annular groove in the bore of the nut. As a coupling element, an open metal ring is inserted into the annular grooves which clicks in elastically.

The metal ring may be bent from a piece of wire, and it may have a circular cross-section or a rectangular cross-sectional shape.

In a preferred aspect of the present invention, the snap-in connection can be disengaged, for example, when the auxiliary piston is urged in the one axial direction by a high hydraulic pressure and, on the other hand, the nut is retained in an opposite axial direction. Such a situation may occur when the nut cannot be rotated due to malfunction, or in adjusting devices which permit rotation of the nut only after hydraulic actuation. When, in such situations, a particularly long actuating travel of the brake piston occurs, an axially fixed auxiliary piston would slip out of its bore in the brake piston and cause complete failure of the hydraulic actuating devices. When, however, the snap-in connection is disengageable, the auxiliary piston will always remain in its bore in the brake piston. A disturbance as described above will cause only disengagement of the snap-in connection, but hydraulic leakage will be prevented.

Disengagement of the snap-in connection is simply possible by at least one annular groove having a ramp-like chamfered groove wall, along which the metal ring slips out also in a radial direction when subjected to axial load.

To fill hydraulic fluid into the brake cylinder, the air contained therein must be bled. Such a bleeding action is normally effected by removing the air prior to the fluid replenishment ('vacuum bleeding') . Problems are involved with niches in the interior of the brake cylinder which are largely separated from the interior. For example, the nut screwed to the spindle forms together with the auxiliary piston an enclosed hollow chamber from which the air may escape only through slots having a small flow cross-section. In a preferred aspect of the present invention, the nut has a radial venting duct through which the air may escape more rapidly from the hollow chamber. In another variation of the present invention, the auxiliary piston has a venting groove which extends from the enclosed hollow chamber to run radially along the annular piston end surface. Thereafter, the groove extends in a paraxial direction on the external peripheral surface of the auxiliary piston until an area which is not covered by the nut.

Embodiments of the present invention will be explained in more detail hereinbelow, taking reference to the accompanying drawings.

DETAILED DESCRIPTION OF THE DRAWINGS

Figure 1:
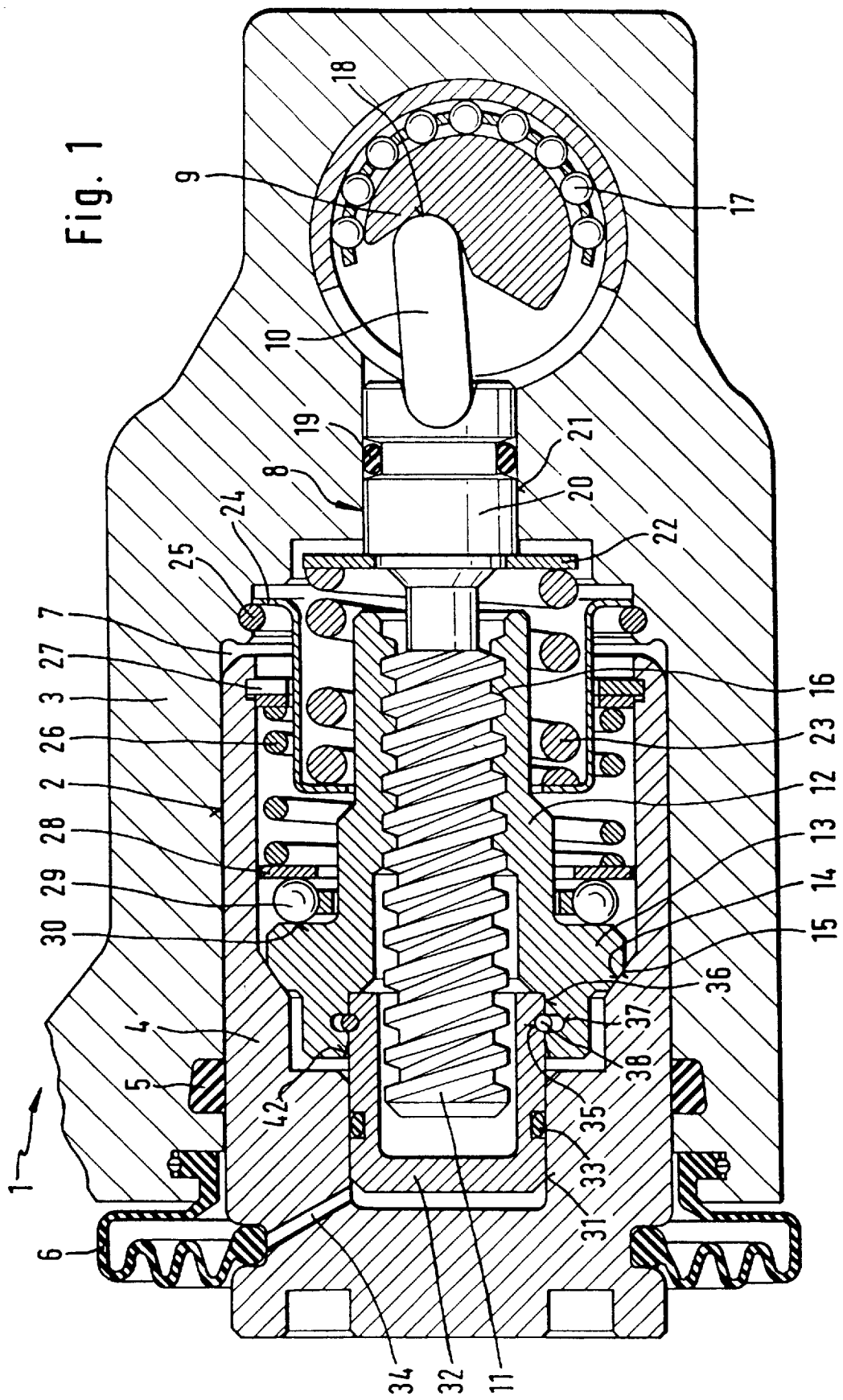
FIG. 1 is a cross-sectional view of a first embodiment of an automatic adjusting device of a disc brake according to the present invention.

The Figures show a part of a brake housing 1 of a disc brake with an automatic adjusting device accommodated in the interior of a cylinder bore 2 of a brake cylinder 3. Brake cylinder 3 is part of a hydraulic actuating device which includes a brake piston 4 that is axially slidable in brake cylinder 3. Brake piston 4 is sealed relative to the cylinder bore 2 by an elastic ring seal 5. Piston 4 is protected against contaminants by an elastic pleated bellows 6. Interior 7 of brake cylinder 3 is filled with hydraulic fluid.

The hydraulic fluid in the interior 7 is pressurized for the hydraulic actuation of the brake cylinder 3. The hydraulic pressure urges the brake piston 4 out of the brake cylinder 3 (to the left in the drawing) to apply brake shoes (not shown) to a brake disc (not shown).

The brake housing 1 also includes a mechanic actuating device 8 which generally comprises a rotatably mounted actuating shaft 9, a pressure member 10, an axially slidable and unrotatable spindle 11, and a nut 12 screwed to the spindle 11. Nut 12 is integrally designed with the coupling element 13 having a conical friction surface 14. Inside the hollow brake piston 4 is a complementary friction surface 15 against which the conical friction surface 14 can be pressed. Spindle 11 and nut 12 are interconnected by a thread 16 without self-locking engagement.

To actuate the mechanic actuating device 8, the actuating shaft 9 which is mounted in a roller bearing 17 devoid of friction is rotated counterclockwise. The pressure member 10 arranged in an eccentric recess 18 is moved to the left, and this movement is transmitted to the spindle 11. Spindle 11 has a guide portion 20 which is slidable in a guide bore 21 of the brake housing 1 and is sealed hydraulically by a ring seal 19. Further, spindle 11 has a retainer 22 which is used as an abutment for one end of a wire spring 23. The other end of wire spring 23 bears against a sheet-metal bowl 24 which, in turn, is fixed in the brake housing 1 by a metal ring 25. Wire spring 23, by way of retainer 22, exerts an axial force on the spindle 11 to the right in opposition to the actuating direction. The spindle 11, urged to the left in the actuating direction, entrains the nut 12 and urges the friction surface 14 of the coupling element 13 against the friction surface 15 of the brake piston 4 so that the nut 12 is retained and supported unrotatably on the brake piston 4. Therefore, the axial force in the actuating direction is transmitted in full extent to the brake piston 4 which is thereby moved to the left in an axial direction to apply the brake shoes (not shown) to the brake disc (not shown).

To terminate the mechanic actuation, the actuating shaft 9 is turned back clockwise, whereupon the wire spring 23, by way of the retainer 22, moves the spindle 11 back to the right in an axial direction.

A second wire spring 26 is arranged inside the brake piston 4. One end of spring 26 is pressed against a circlip 27 which is unslidably attached to brake piston 4. The other end of spring 26 is pressed against a movable disc-type ring 28. The axially movable, unrotatable disc-type ring 28 (by way of a ball bearing 29) is urged axially against a bearing surface 30 of the rotatable nut 12. This action moves the nut 12 to the left, urging it with friction surface 14 against friction surface 15 of the brake piston 4. The result is that the friction clutch provided between friction surfaces 14 and 15 is always closed in the non-applied condition of the disc brake.

The brake piston 4 moves to the left when hydraulically operated. As soon as this movement of the brake piston 4, due to progressing wear of the brake linings, exceeds a small amount which is determined by the axial clearance of the thread 16 without self-locking engagement, the nut 12 is prevented from further axial movement by the spindle 11 which is in its inactive position. Continued axial movement of the brake piston 4 causes the friction clutch between the friction surfaces 14 and 15 to open. This makes the nut 12 rotatable in relation to spindle 11. Caused by the axial force that is exerted by the wire spring 26 on the nut 12 by way of ball bearing 29, nut 12 will turn on the spindle 11 by way of the thread 16 without self-locking engagement until the axial movement of the nut 12 to the left is sufficient to restore engagement of the friction surfaces 14, 15 and thereby terminate rotation of the nut 12. Of course, the axial force to the left generated by the spring 26 must not be in excess of the axial force to the right generated by spring 23.

An auxiliary piston 32 is slidable in a bore 31 of the brake piston 4 and hydraulically sealed by a ring seal 33. Auxiliary piston 32 is exposed to hydraulic pressure on its right axial side and to atmospheric pressure on its left axial side. This is permitted by a small channel 34 which extends from the bottom of bore 31 to connect the interior with the outside chamber. The auxiliary piston 32 is connected to the nut 12 by an axially lockable snap-in connection. The snap-in connection is provided by a circumferential annular groove 35 on the outside of auxiliary piston 32, an internal circumferential annular groove 37 in a bore 36 of the nut 12, and an open metal ring 38 which is snapped into the aligned annular grooves 35 and 37. The metal ring 38 is bent from a piece of wire and has a round cross-section.

Figure 2:
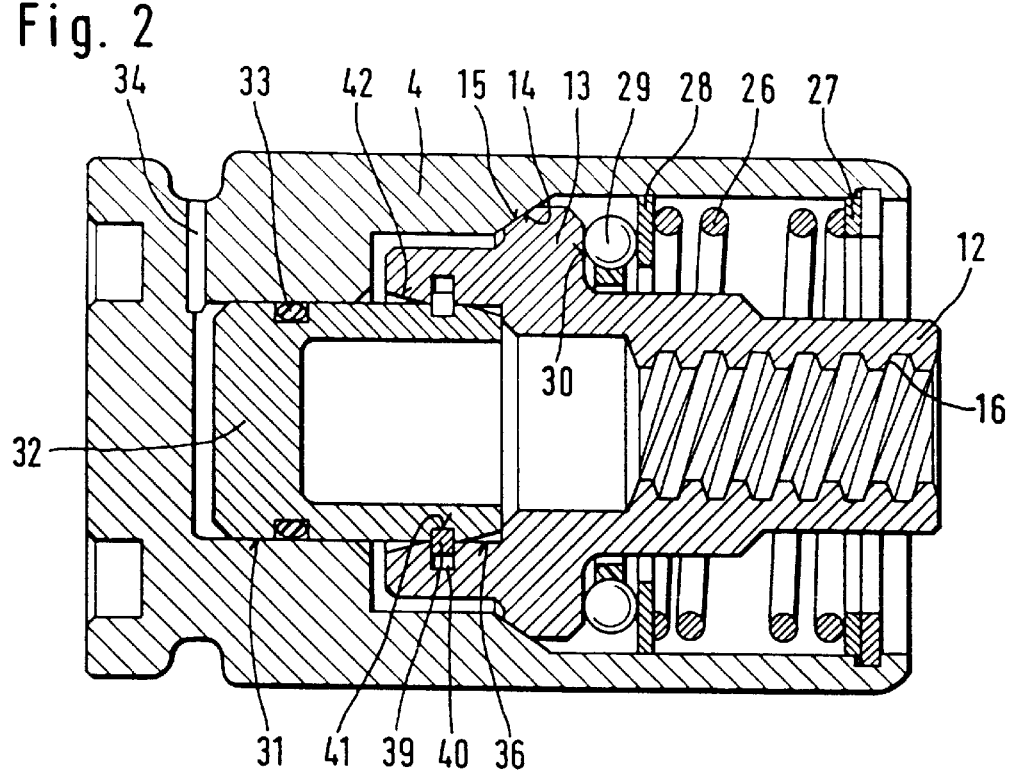
FIG. 2 is a partial view, similar to FIG. 1, of a second embodiment of an automatic adjusting device.

In the modified embodiment of the present invention shown in FIG. 2, the metal ring 39 has a rectangular design in cross-section. Ring 39 is snapped on into a correspondingly modified annular groove 40 of nut 12 and a modified annular groove 41 of the auxiliary piston 32. To facilitate snapping on of the respective metal ring 38, 39, the nut 12 has a chamfer 42 on the mouth of its bore 36.

The function of the auxiliary piston 32 is to perform an axial movement to the left in relation to the brake piston 4 in the presence of high pressure. Due to the snap-in connection, the auxiliary piston 32 tends to entrain the nut 12 axially to the left. This causes closure of the friction clutch by the friction surface 14 abutting the friction surface 15. The nut 12 which now became unrotatable, upon continued axial movement of the brake piston 4 to the left, tends to entrain the spindle 11 in the same axial direction. This action is not successful as long as the axial force to the left, generated by the hydraulic pressure on the auxiliary piston 32, is smaller than the axial force to the right which is applied to the spindle 11 by the wire spring 23 and by hydraulic pressure. When, however, the hydraulic pressure exceeds a predefined value, the force of the auxiliary piston 32 will exceed the counteracting force of the wire spring 23 and the hydraulic counteracting force, and the spindle 11 moves to the left together with the nut 12 and the brake piston 4. The adjusting device is not readjusted by rotation of the nut 12 on the spindle 11 in this case.

The purpose of preventing readjustment under high hydraulic pressure, as described, is that a high hydraulic pressure produces extremely great clamping forces. However, the brake housing 1 inheres a certain elasticity and expands slightly when very high clamping forces are applied. If the longer actuating travel of the brake piston 4, which is due to the brake housing 1 expanding, was compensated by readjustment of the adjusting device, the disc brake would lock upon termination of the hydraulic actuation because the brake housing 1 deforms elastically to resume its initial shape, without the brake piston 4 being permitted to perform a corresponding return movement.

Figure 3:
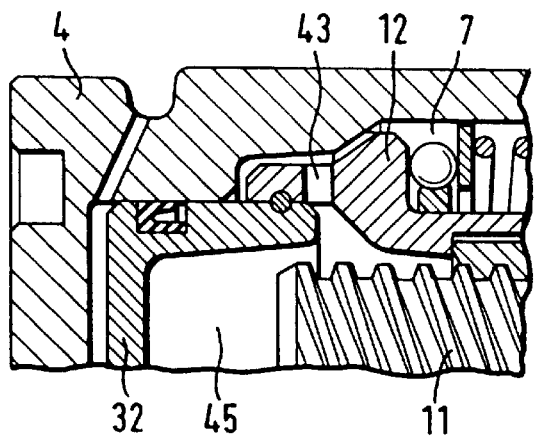
FIGS. 3 and 4 each show a partial cross-sectional view of preferred aspects of the present invention.

In an embodiment of the present invention shown in FIG. 3, the nut 12 has a venting duct 43 which provides a connection between a hollow chamber 45, produced by the nut 12, the spindle 11 and the auxiliary piston 32, and the interior 7 of the brake cylinder 3.

Figure 4:
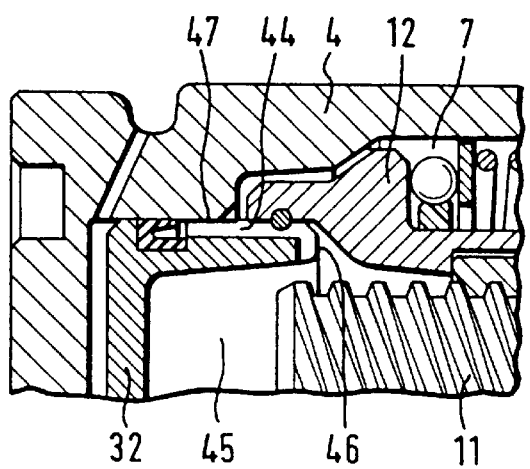

In the variation of the present invention shown in FIG. 4, the auxiliary piston 32 has a venting groove 44 which extends from the hollow chamber 45 radially alongside the piston end surface 46, where it deflects in a paraxial direction to extend on the peripheral surface 47 of the auxiliary piston 32 until an area which is not covered by the nut 12.

What is claimed is:

1. Disc brake with an automatic adjusting device; comprising:

a hydraulic actuating device having a brake piston that is slidable in a brake cylinder;

a mechanical actuating device having an axially slidable, unrotatable spindle for transmitting a paraxial actuating force to the brake piston and a nut screwed to the spindle;

a coupling element which is unrotatably connected to the nut and has a conical friction surface which, on mechanical actuation of the disc brake, is adapted to be urged against a friction surface provided on the brake piston to prevent rotation of the nut;

means for axially resiliently retaining the coupling element upon hydraulic actuation of the brake so that the axially moved brake piston is disengaged from the coupling element and permits rotation of the nut on the spindle for readjustment of the adjusting device as long as the hydraulic pressure does not exceed a predetermined value;

an auxiliary piston slidable in an axial bore of the brake piston and connected to the nut, which auxiliary piston is exposed to hydraulic pressure on the one axial side and to atmospheric pressure on the other side so that the coupling element with its friction surface is again urged against the friction surface of the brake piston when hydraulic pressure prevails which exceeds the value determined by the resilient retaining force, wherein the auxiliary piston and the coupling element are provided on two separate component parts, wherein the auxiliary piston is connected to the nut by an axially lockable snap-in connection, and the auxiliary piston is accommodated in a bore of the nut and has on its outside a circumferential annular groove which is in alignment with an internal circumferential annular groove in the bore of the nut, and wherein an open metal ring is inserted into the annular grooves as a coupling element, wherein the snap-in connection is disengageable.

2. Disc brake as claimed in claim 1, wherein the coupling element is integrally designed with the nut.

3. Disc brake as claimed in claim 1, wherein the metal ring is bent from a piece of wire.

4. Disc brake as claimed in claim 1, wherein the metal ring has a rectangular cross-sectional shape.

5. Disc brake as claimed in claim 1 wherein at least one of the annular grooves has a ramp-like chamfered groove wall.

6. Disc brake as claimed in claim 1, wherein the nut has a generally radial venting duct.

7. Disc brake as claimed in claim 1, wherein the auxiliary piston has at least one venting groove which extends from an enclosed hollow chamber to run radially along an annular piston end surface and, thereafter, runs in a paraxial direction on an external peripheral surface of the auxiliary piston until an area which is not covered by the nut.

8. Disc brake with an automatic adjusting device, comprising:

a hydraulic actuating device having a brake piston that is slidable in a brake cylinder;

a mechanical actuating device having an axially slidable, unrotatable spindle for transmitting a paraxial actuating force to the brake piston and a nut screwed to the spindle;

a coupling element which is unrotatably connected to the nut and has a conical friction surface which, on mechanical actuation of the disc brake, is adapted to be urged against a friction surface provided on the brake piston to prevent rotation of the nut;

means for axially resiliently retaining the coupling element upon hydraulic actuation of the brake so that the axially moved brake piston is disengaged from the coupling element and permits rotation of the nut on the spindle for readjustment of the adjusting device as long as the hydraulic pressure does not exceed a predetermined value;

an auxiliary piston slidable in an axial bore of the brake piston and connected to the nut, which auxiliary piston is exposed to hydraulic pressure on the one axial side and to atmospheric pressure on the other side so that the coupling element with its friction surface is again urged against the friction surface of the brake piston when hydraulic pressure prevails which exceeds the value determined by the resilient retaining force, wherein the auxiliary piston and the coupling element are provided on two separate component parts, wherein the auxiliary piston is connected to the nut by an axially lockable snap-in connection, and the auxiliary piston is accommodated in a bore of the nut and has on its outside a circumferential annular groove which is in alignment with an internal circumferential annular groove in the bore of the nut, and wherein an open metal ring is inserted into the annular grooves as a coupling element wherein at least one of the annular grooves has a ramp-like chamfered groove wall.

9. Disc brake as claimed in claim 8, wherein the coupling element is integrally designed with the nut.

10. Disc brake as claimed in claim 8, wherein the metal ring is bent from a piece of wire.

11. Disc brake as claimed in claim 8, wherein the metal ring has a rectangular cross-sectional shape.

12. Disc brake as claimed in claim 8, wherein the snap-in connection is disengageable.

13. Disc brake as claimed in claim 8, wherein the nut has a generally radial venting duct.

14. Disc brake as claimed in claim 8, wherein the auxiliary piston has at least one venting groove which extends from an enclosed hollow chamber to run radially along an annular piston end surface and, thereafter, runs in a paraxial direction on an external peripheral surface of the auxiliary piston until an area which is not covered by the nut.

15. Disc brake with an automatic adjusting device, comprising:

a hydraulic actuating device having a brake piston that is slidable in a brake cylinder;

a mechanical actuating device having an axially slidable, unrotatable spindle for transmitting a paraxial actuating force to the brake piston and a nut screwed to the spindle:

a coupling element which is unrotatably connected to the nut and has a conical friction surface which, on mechanical actuation of the disc brake, is adapted to be urged against a friction surface provided on the brake piston to prevent rotation of the nut;

means for axially resiliently retaining the coupling element upon hydraulic actuation of the brake so that the axially moved brake piston is disengaged from the coupling element and permits rotation of the nut on the spindle for readjustment of the adjusting device as long as the hydraulic pressure does not exceed a predetermined value;

an auxiliary piston slidable in an axial bore of the brake piston and connected to the nut, which auxiliary piston is exposed to hydraulic pressure on the one axial side and to atmospheric pressure on the other side so that the coupling element with its friction surface is again urged against the friction surface of the brake piston when hydraulic pressure prevails which exceeds the value determined by the resilient retaining force, wherein the auxiliary piston and the coupling element are provided on two separate component parts, wherein the auxiliary piston is connected to the nut by an axially lockable snap-in connection, and the auxiliary piston is accommodated in a bore of the nut and has on its outside a circumferential annular groove which is in alignment with an internal circumferential annular groove in the bore of the nut, and wherein an open metal ring is inserted into the annular grooves as a coupling element wherein the auxiliary piston has at least one venting groove which extends from an enclosed hollow chamber to run radially along an annular piston end surface and, thereafter, runs in a paraxial direction on an external peripheral surface of the auxiliary piston until an area which is not covered by the nut.

16. Disc brake as claimed in claim 15, wherein the coupling element is integrally designed with the nut.

17. Disc brake as claimed in claim 15, wherein the metal ring is bent from a piece of wire.

18. Disc brake as claimed in claim 15, wherein the metal ring has a rectangular cross-sectional shape.

19. Disc brake as claimed in claim 15, wherein the snap-in connection is disengageable.

20. Disc brake as claimed in claim 15, wherein at least one of the annular grooves has a ramp-like chamfered groove wall.

21. Disc brake as claimed in claim 15, wherein the nut has a generally radial venting duct.

* * * * *